(12) United States Patent
Knigge et al.

(10) Patent No.: US 9,001,453 B1
(45) Date of Patent: Apr. 7, 2015

(54) DATA STORAGE DEVICE CALIBRATING FLY HEIGHT ACTUATOR BASED ON READ MODE TOUCHDOWN RESISTANCE OF TOUCHDOWN SENSOR

(71) Applicant: Western Digital Technologies, Inc., Irvine, CA (US)

(72) Inventors: Bernhard E. Knigge, San Jose, CA (US); Jian Xu, San Jose, CA (US); Robert E. Eaton, San Jose, CA (US); Zhen Ye, Singapore (SG)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/335,724

(22) Filed: Jul. 18, 2014

(51) Int. Cl.
  *G11B 21/02* (2006.01)
  *G11B 5/60* (2006.01)

(52) U.S. Cl.
  CPC .................................. *G11B 5/6076* (2013.01)

(58) Field of Classification Search
  None
  See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |
| 6,337,778 B1 | 1/2002 | Gagne | |
| 6,369,969 B1 | 4/2002 | Christiansen et al. | |

(Continued)

*Primary Examiner* — K. Wong

(57) ABSTRACT

A data storage device is disclosed comprising a disk, a head comprising a touchdown sensor, and a fly height actuator (FHA) configured to actuate the head vertically over the disk based on an FHA setting. The data storage device is configured into a read mode, and while in the read mode, the FHA setting is adjusted until the head contacts the disk and a touchdown read mode resistance of the touchdown sensor is measured. The data storage device is configured into a write mode and the FHA setting is adjusted so the head is not contacting the disk. While in the write mode, a non-touchdown write mode resistance of the touchdown sensor is measured, and a write touchdown FHA setting that will cause the head to contact the disk while in the write mode is estimated based on the touchdown read mode resistance and the non-touchdown write mode resistance.

22 Claims, 7 Drawing Sheets

(56) References Cited

U.S. PATENT DOCUMENTS

| | | |
|---|---|---|
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |

(56) References Cited

U.S. PATENT DOCUMENTS

| | | |
|---|---|---|
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,961,420 B2 | 6/2011 | Park |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |

(56) References Cited

U.S. PATENT DOCUMENTS

| | | | |
|---|---|---|---|
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | Deforest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,526,274 B2 | 9/2013 | Naniwa et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,643,981 B2 | 2/2014 | Natori |
| 8,654,618 B1 | 2/2014 | Liu et al. |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 * | 8/2014 | Barlow et al. ................... 360/55 |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2009/0113702 A1 | 5/2009 | Hogg |
| 2010/0306551 A1 | 12/2010 | Meyer et al. |
| 2011/0226729 A1 | 9/2011 | Hogg |
| 2011/0235207 A1 | 9/2011 | Yang |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0077189 A1 | 3/2013 | Kato et al. |
| 2013/0083430 A1 | 4/2013 | Chiu et al. |
| 2013/0188273 A1 | 7/2013 | Miyamoto et al. |

\* cited by examiner

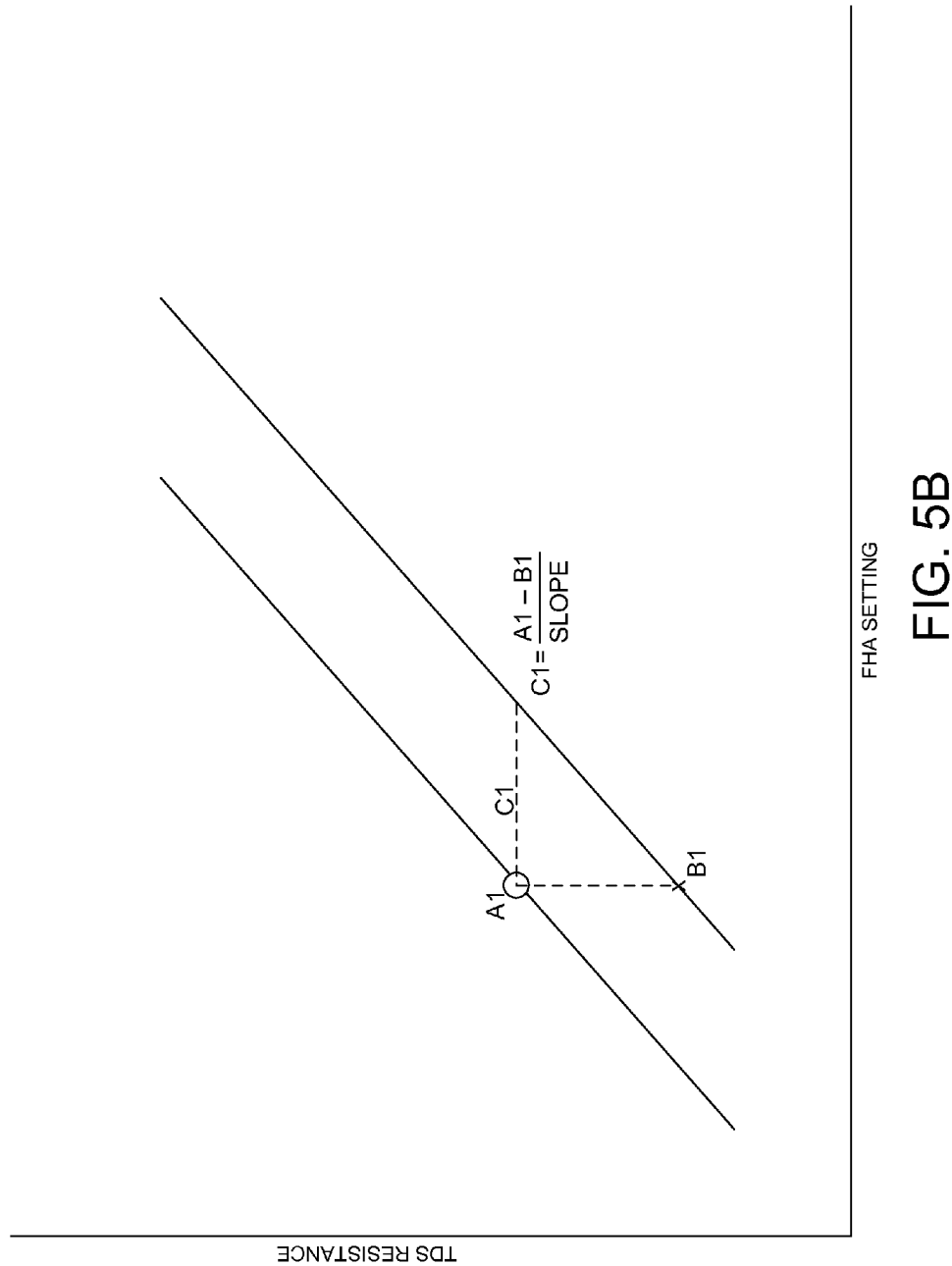

DATA STORAGE DEVICE CALIBRATING FLY HEIGHT ACTUATOR BASED ON READ MODE TOUCHDOWN RESISTANCE OF TOUCHDOWN SENSOR

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

Since the quality of the write/read signal depends on the fly height of the head, conventional heads may comprise an actuator for controlling the fly height. Any suitable dynamic fly height (DFH) actuator may be employed, such as a heater which controls fly height through thermal expansion, or a piezoelectric (PZT) actuator. It is desirable to determine the appropriate DFH setting (e.g., appropriate current applied to a heater) that achieves the target fly height for the head.

BRIEF DESCRIPTION OF THE DRAWINGS

FIG. 5B shows an embodiment wherein the write touchdown FHA setting is estimated based on a shift between a non-touchdown read mode resistance of the touchdown sensor and a non-touchdown write mode resistance of the touchdown sensor.

DETAILED DESCRIPTION

Figure 1A:
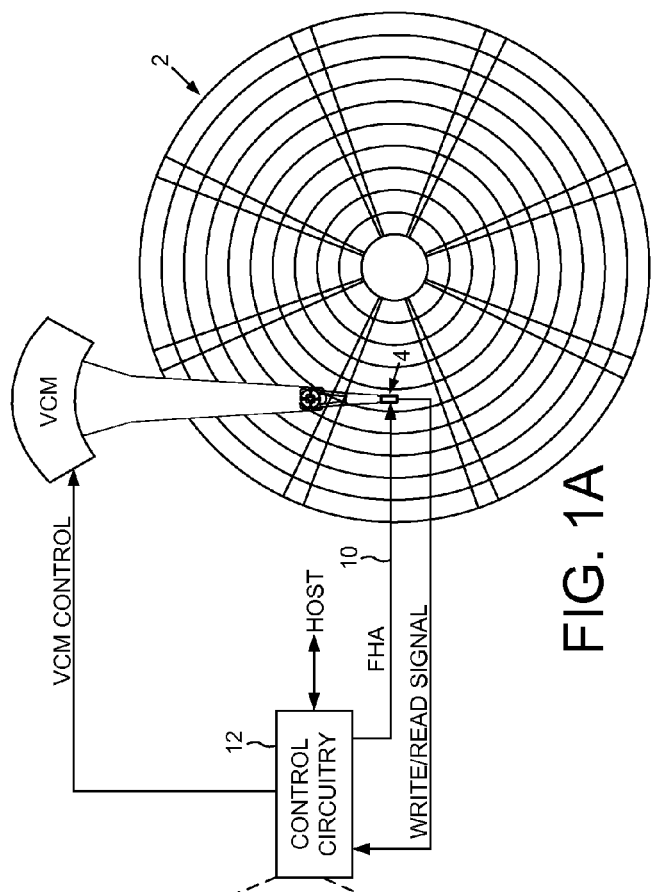
FIG. 1A, shows a data storage device in the form of a disk drive according to an embodiment comprising a head actuated vertically over a disk by a fly height actuator (FHA).

FIG. 1A shows a data storage device in the form of a disk drive according to an embodiment comprising a disk 2, a head 4 (FIG. 1B) comprising a touchdown sensor 6, and a fly height actuator (FHA) 8 configured to actuate the head 4 vertically over the disk 2 based on an FHA setting 10. The data storage device further comprises control circuitry 12 configured to execute the flow diagram of FIG. 1C. The data storage device is configured into a read mode (block 14), and while in the read mode, the FHA setting is adjusted until the head contacts the disk and a touchdown read mode resistance of the touchdown sensor is measured (block 16). The data storage device is configured into a write mode and the FHA setting is adjusted so the head is not contacting the disk (block 18). While in the write mode, a non-touchdown write mode resistance of the touchdown sensor is measured (block 20), and a write touchdown FHA setting that will cause the head to contact the disk while in the write mode is estimated based on the touchdown read mode resistance and the non-touchdown write mode resistance (block 22).

Figure 1B:
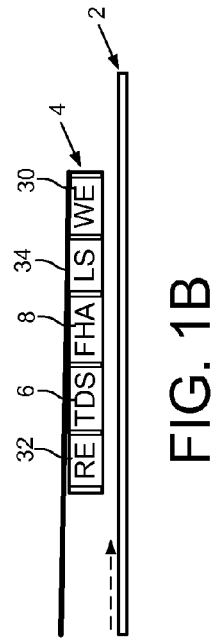
FIG. 1B shows an embodiment wherein the head comprises a write element (WE), a read element (RE), the FHA, a touchdown sensor (TDS), and a laser (LS).
Figure 1C:
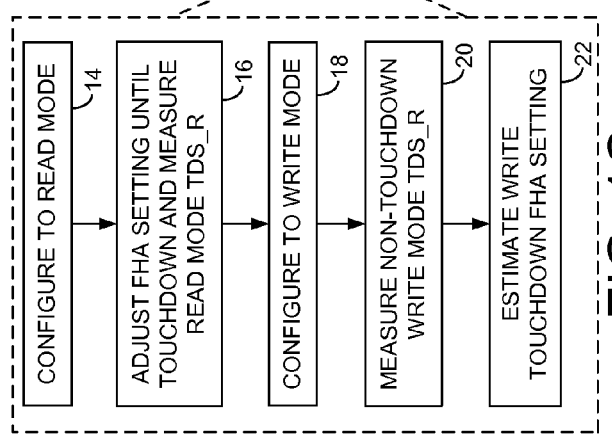
FIG. 1C is a flow diagram according to an embodiment wherein a write touchdown FHA setting that will cause the head to contact the disk while in a write mode is estimated based on a touchdown read mode resistance and a non-touchdown write mode resistance of the touchdown sensor.

Any suitable head 4 may be employed in the embodiments, wherein in the embodiment of FIG. 1B the head 4 comprises a suitable write element 30 (e.g., an inductive coil), a suitable read element 32 (e.g., a magnetoresistive element), and a suitable fly height actuator (FHA) 8 configured to actuate the head 4 vertically over the disk 2. Any suitable FHA 8 may be employed, such as a heater that actuates through thermal expansion, or a piezoelectric actuator that actuates through mechanical deflection. The head 4 in the embodiment of FIG. 1B also comprises a suitable laser 34 (e.g., a laser diode) configured to heat the surface of the disk during write operations for HAMR disk drives.

In one embodiment the FHA setting 10 is configured so that the head 4 maintains a target fly height during write and read operations. This helps ensure the data is recorded on the disk reliably (e.g., by generating the appropriate magnetic write field), as well as helps ensure the data is recovered reliably (e.g., by providing an adequate signal-to-noise ratio (SNR) in the read signal). In one embodiment, the FHA setting corresponding to the target fly height during read operations is determined by finding the FHA setting that causes the head to touchdown onto the disk, and then backing off the touchdown FHA setting by a delta. However, in one embodiment employing the touchdown technique to find a write mode touchdown FHA setting may be undesirable since inducing a touchdown may degrade or damage one or more of the write components. For example, applying a write current to a write coil may cause the write coil to protrude toward the disk due to thermal expansion. Similarly, applying a write current to a laser for HAMR disk drives may cause a near field transducer (NFT) to protrude toward the disk due to thermal expansion. This thermal protrusion may result in a single point contact by the write element during touchdown which may degrade or damage the write component, and therefore in one embodiment the write mode touchdown FHA setting is estimated without actually performing a write mode touchdown procedure (or by performing a small number of write mode touchdown procedures).

Any suitable touchdown sensor 6 may be employed in the embodiments, such as a suitable temperature sensitive sensor (e.g., a suitable magnetoresistive element having a thermal coefficient of resistance (TCR)). As the fly height of the head 4 changes, there is a corresponding change in resistance of the touchdown sensor 6 due to a corresponding change in temperature. This change in resistance may be monitored in order to measure the fly height of the head as well as detect when the head has contacted the disk during a touchdown event.

Figure 1D:
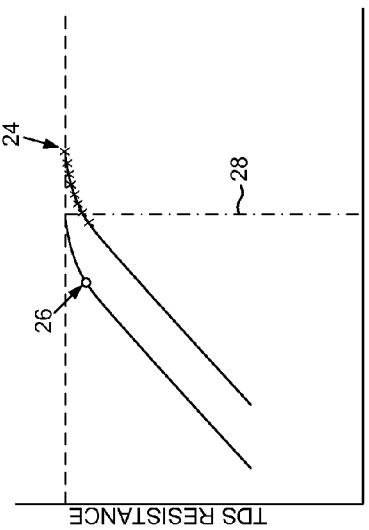
FIG. 1D shows an embodiment wherein a plurality of touchdown read mode resistances of the touchdown sensor are measured while adjusting the FHA setting until the head contacts the disk, and then the write touchdown FHA setting is estimated based on the touchdown read mode resistance of the touchdown sensor.

FIG. 1D illustrates an example embodiment wherein the resistance of the touchdown sensor is measured while adjusting the FHA setting until the head contacts the disk and a touchdown read mode resistance 24 of the touchdown sensor is measured. While in the write mode, a non-touchdown write mode resistance 26 of the touchdown sensor is measured, and a write touchdown FHA setting 28 that will cause the head to contact the disk while in the write mode is estimated based on the touchdown read mode resistance 24 and the non-touchdown write mode resistance 26.

Figure 2:
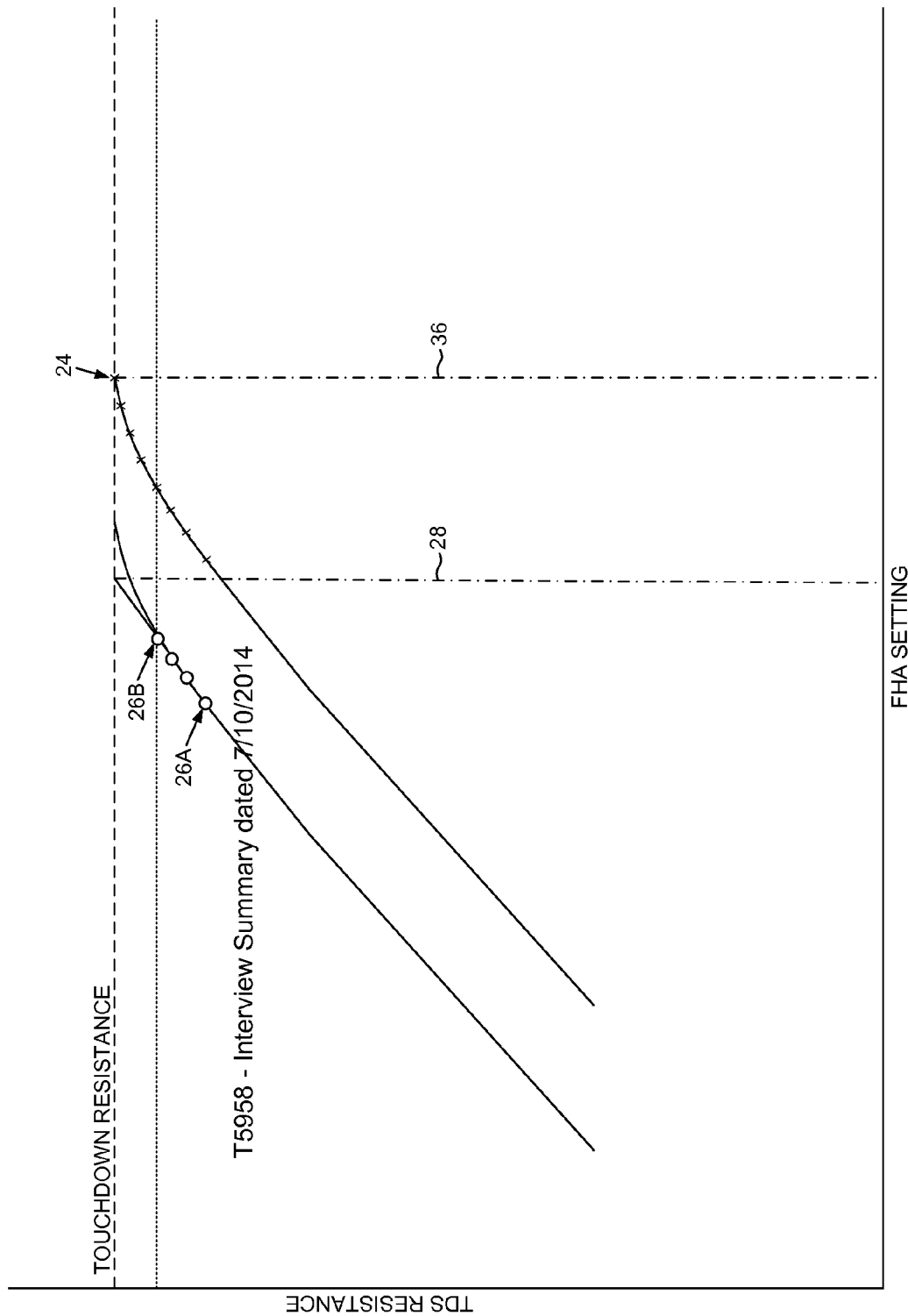
FIG. 2 shows an embodiment wherein the write touchdown FHA setting is estimated by extrapolating a plurality of non-touchdown write mode resistances toward the touchdown read mode resistance of the touchdown sensor.

Any suitable technique may be employed to estimate the write touchdown FHA setting 28 that will cause the head to contact the disk based on the touchdown read mode resistance 24 and the non-touchdown write mode resistance 26. FIG. 2 illustrates an embodiment wherein a plurality of non-touchdown read mode resistances (represented by "x"s) are measured while adjusting the FHA setting until the head contacts the disk. Any suitable technique may be employed to detect when the head contacts the disk, such as by processing a touchdown signal generated by the touchdown sensor using any suitable statistical analysis. After determining the touchdown read mode resistance 24, a plurality of non-touchdown write mode resistances (represented as "o"s) are measured while increasing the FHA setting up until the non-touchdown write mode resistance 26B nears the touchdown read mode resistance 24. The write touchdown FHA setting 28 is then estimated by extrapolating the non-touchdown write mode resistances toward the touchdown read mode resistance as illustrated in FIG. 2. The write touchdown FHA setting 28 is less than the read touchdown FHA setting 36 in FIG. 2 due to the protrusion of a write component (e.g., NFT) during the write mode. This embodiment estimates the touchdown FHA setting 28 through extrapolation so as to avoid head/disk contact that would otherwise occur if the write mode FHA setting were increased until touchdown.

Figure 3:
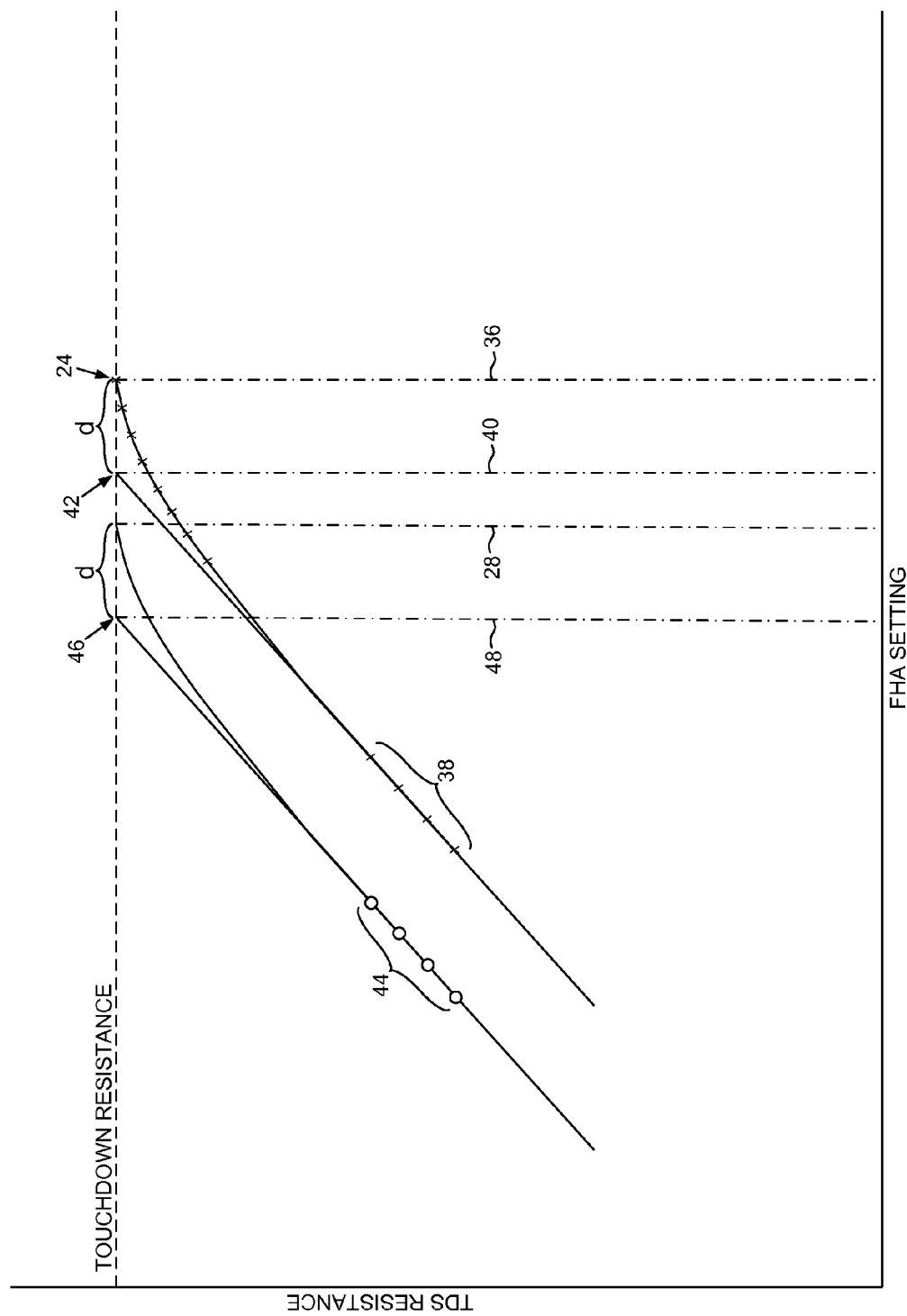
FIG. 3 shows an embodiment wherein the write touchdown FHA setting is estimated based on a delta from a read touchdown FHA setting, wherein the delta is based on the touchdown read mode resistance and the non-touchdown write mode resistance of the touchdown sensor.

FIG. 3 illustrates an alternative embodiment for estimating the write touchdown FHA setting 28 based on the touchdown read mode resistance 24. While in the read mode, a non-touchdown read mode resistance 38 of the touchdown sensor is measured for a plurality of the FHA settings. A first linear fit of the plurality of non-touchdown read mode resistances 38 is generated and a delta (d) is generated representing a difference between the read mode FHA setting 36 that causes the head to contact the disk and a FHA setting 40 corresponding to a first intercept 42 of the first linear fit with the touchdown read mode resistance 24 of the touchdown sensor. While in the write mode, the FHA setting is adjusted and a non-touchdown write mode resistance 44 of the touchdown sensor is measured for a plurality of the FHA settings. A second linear fit of the plurality of non-touchdown write mode resistances 44 is generated, and the write touchdown FHA setting is estimated based on the delta (d) and a second intercept 46 of the second linear fit with the touchdown read mode resistance 24 of the touchdown sensor. In other words, the non-touchdown write mode resistances 44 are extrapolated through a linear curve fit to find the intercept 46 of the line with the touchdown read mode resistance 24 and the corresponding FHA setting 48. The write touchdown FHA setting 28 is then estimated by adding the delta (d) to the FHA setting 48, wherein the delta (d) corresponds to the difference between the read mode FHA setting 40 and the read mode FHA setting 36.

Figure 4:
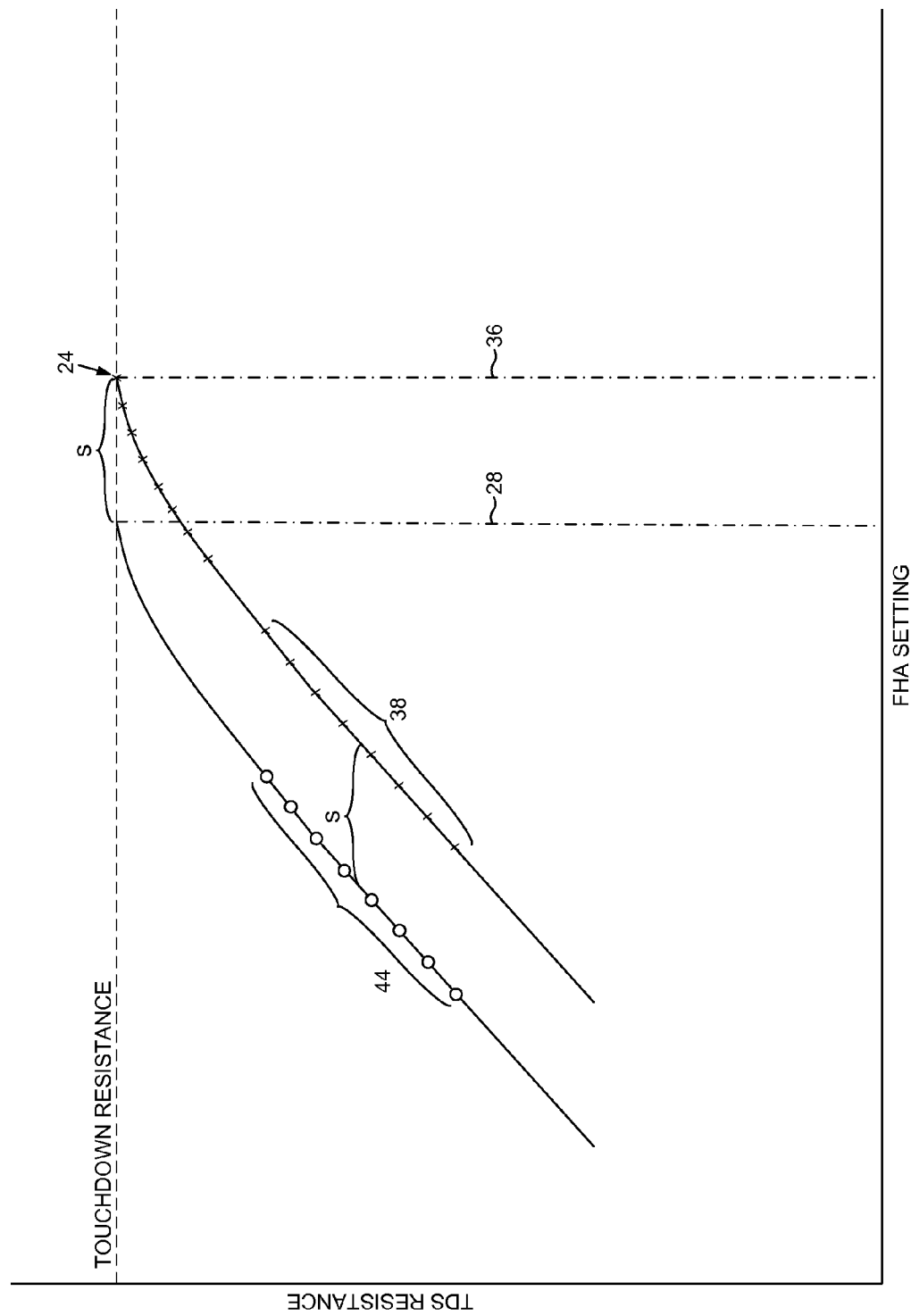
FIG. 4 shows an embodiment wherein the write touchdown FHA setting is estimated based on a plurality of non-touchdown read mode resistances of the touchdown sensor and a plurality of non-touchdown write mode resistances of the touchdown sensor.

FIG. 4 illustrates another embodiment for estimating the write touchdown FHA setting 28 based on the touchdown read mode resistance 24. In this embodiment, a FHA setting delta (s) is measured between the plurality of non-touchdown read mode resistances 38 of the touchdown sensor and the plurality of non-touchdown write mode resistances 44 of the touchdown sensor. In this embodiment, the FHA setting delta (s) represents the shift of the curve representing the read mode resistance of the touchdown sensor and the curve representing the write mode resistance. The FHA setting delta (s) or shift between the two curves may be measured in any suitable manner. In one embodiment, the FHA setting delta (s) may be estimated by minimizing the equation:

$$|w(k)-f(x^*+s)|^2$$

where w(k) represents the measured non-touchdown write mode resistances 44, f(x) represents a curve fitted function of the measured non-touchdown read mode resistances 38, and x* represents the FHA settings used to measure w(k). The above equation reaches a minimum when the partial derivative with respect to the FHA setting delta (s) reaches zero. For example, if f(x) is represented using a third-order polynomial, then the partial derivative of f(x) is a second-order polynomial and the partial derivative of the above equation is a fifth-order polynomial. Once the FHA setting delta (s) is estimated, in one embodiment the write touchdown FHA setting 28 is estimated by subtracting the FHA setting delta (s) from the read touchdown FHA setting 36.

Figure 5A:
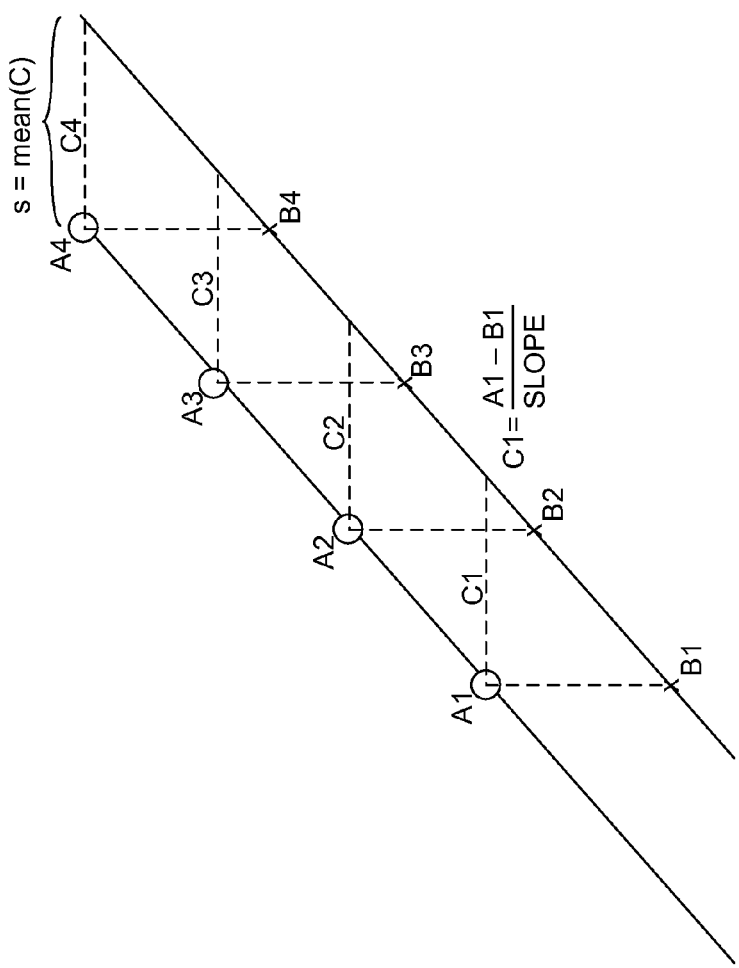
FIG. 5A shows an embodiment wherein the write touchdown FHA setting is estimated based on a shift between the non-touchdown read mode resistances of the touchdown sensor and the non-touchdown write mode resistances of the touchdown sensor.

FIG. 5A illustrates a simplified embodiment for estimating the FHA setting delta (s) described above with reference to FIG. 4. In the embodiment of FIG. 5A, a non-touchdown write mode resistance (A) and a non-touchdown read mode resistance (B) is measured at various FHA settings. A slope of the line representing either or both of the non-touchdown resistances is also estimated. For each set of non-touchdown resistances (e.g., A1 and B1), a corresponding shift value C between the two lines is computed as shown in FIG. 5A. The FHA setting delta (s) may then be estimated as the mean of the computed shift values (e.g., mean of C1 to C4). In an alternative embodiment shown in FIG. 5B, a single shift value C1 may be computed based on a single FHA setting and corresponding non-touchdown resistances A1 and B1. This latter embodiment reduces the processing time to estimate the write touchdown FHA setting 28 since it requires fewer non-touchdown resistance measurements.

In one embodiment, the write touchdown FHA setting 28 may be estimated for a plurality of different write mode settings (e.g., different write current applied to a write coil and/or different write current applied to a laser). For example, a different write mode setting may be employed under different environmental conditions (temperature, altitude, etc.)

and/or a different write mode setting may be employed at different radiation locations across the disk. Accordingly, one or more of the techniques described above may be used to estimate the write touchdown FHA setting 28 across various possible write mode settings. In one embodiment, only a subset of the write mode settings are evaluated to estimate a corresponding plurality of write touchdown FHA settings 28 which may then be interpolated and/or extrapolated so as to fill in gaps between the unmeasured write mode settings. During normal operation, when the control circuitry 12 adjusts the write mode setting, the control circuitry 12 makes a corresponding adjustment to the write mode FHA setting so as to maintain a target fly height for the head during write operations.

Figure 6:
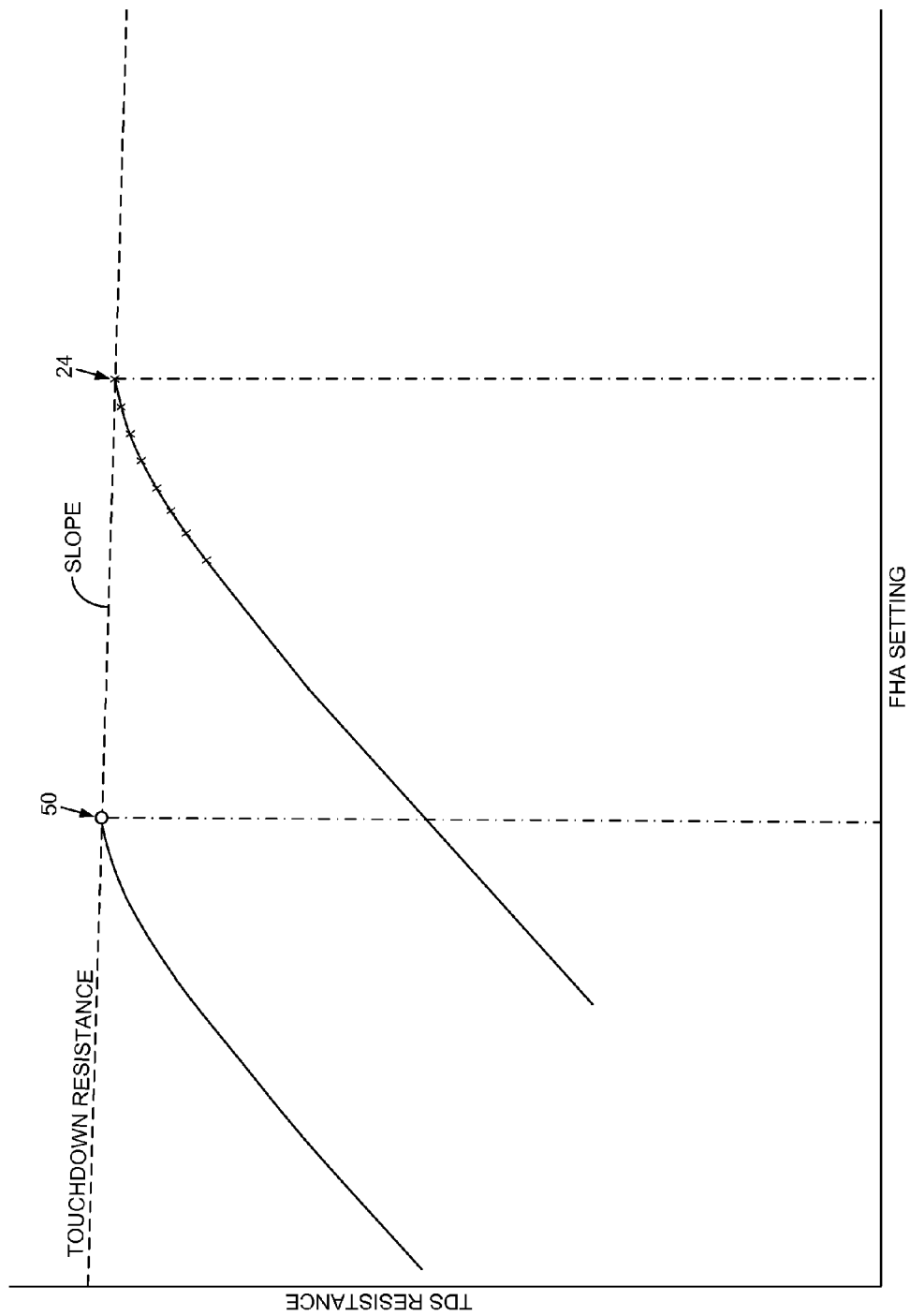
FIG. 6 shows an embodiment wherein the write touchdown FHA setting is estimated based on a slope of a line passing through a touchdown write mode resistance and a touchdown read mode resistance of the touchdown sensor.

In the above embodiments, it may be assumed the touchdown resistance of the touchdown sensor will not change between the read mode and the write mode. That is, it may be assumed the dashed line representing the touchdown resistance in FIG. 1D may be horizontal (slope of zero) such that the touchdown write mode resistance will be substantially the same as the touchdown read mode resistance 24. In another embodiment illustrated in FIG. 6, the touchdown resistance of the touchdown sensor may vary as the write mode setting is adjusted (e.g., as the write current of the write coil and/or the write current of the laser is adjusted) resulting in a non-zero linear slope of the touchdown resistance. In one embodiment, the slope of this line shown in FIG. 6 may be estimated by measuring a touchdown write mode resistance 50 relative to the touchdown read mode resistance 24. The touchdown write mode resistance 50 may be measured by configuring a target write mode setting and then increasing the FHA setting until touchdown is detected. Since the write mode touchdown is performed a single time (or a few times), the degradation to the write components is minimized. Once the slope of the touchdown resistance has been estimated, it may be used to modify the above embodiments to more accurately estimate the write touchdown FHA setting 28 across multiple write mode settings while avoiding an actual touchdown measurement.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk;
a head comprising a touchdown sensor;
a fly height actuator (FHA) configured to actuate the head vertically over the disk based on an FHA setting; and
control circuitry configured to:
configure the data storage device into a read mode;
while in the read mode, adjust the FHA setting until the head contacts the disk and measure a touchdown read mode resistance of the touchdown sensor;
configure the data storage device into a write mode and adjust the FHA setting so the head is not contacting the disk;
while in the write mode, measure a non-touchdown write mode resistance of the touchdown sensor; and
estimate a write touchdown FHA setting that will cause the head to contact the disk while in the write mode based on the touchdown read mode resistance and the non-touchdown write mode resistance.

2. The data storage device as recited in claim 1, wherein the control circuitry is further configured to:
while in the write mode, adjust the FHA setting and measure a non-touchdown write mode resistance of the touchdown sensor until the non-touchdown write mode resistance nears the touchdown read mode resistance; and estimate the write touchdown FHA setting by extrapolating the non-touchdown write mode resistances toward the touchdown read mode resistance.

3. The data storage device as recited in claim 1, wherein the control circuitry is further configured to estimate the write touchdown FHA setting based on a delta from a read touchdown FHA setting that causes the head to contact the disk while in the read mode, wherein the delta is based on the touchdown read mode resistance and the non-touchdown write mode resistance.

4. The data storage device as recited in claim 1, wherein the control circuitry is further configured to:

while in the read mode, measure a non-touchdown read mode resistance of the touchdown sensor for a plurality of the FHA settings; and estimate the write touchdown FHA setting based on the plurality of non-touchdown read mode resistances of the touchdown sensor.

5. The data storage device as recited in claim 4, wherein the control circuitry is further configured to:

first linear fit the plurality of non-touchdown read mode resistances and generate a delta representing a difference between the read mode FHA setting that causes the head to contact the disk and a FHA setting corresponding to a first intercept of the first linear fit with the touchdown read mode resistance of the touchdown sensor;

while in the write mode, adjust the FHA setting and measure a non-touchdown write mode resistance of the touchdown sensor for a plurality of the FHA settings;

second linear fit the plurality of non-touchdown write mode resistances of the touchdown sensor; and estimate the write touchdown FHA setting based on the delta and a second intercept of the second linear fit with the touchdown read mode resistance of the touchdown sensor.

6. The data storage device as recited in claim 4, wherein the control circuitry is further configured to:

while in the write mode, adjust the FHA setting and measure a non-touchdown write mode resistance of the touchdown sensor for a plurality of the FHA settings; and estimate the write touchdown FHA setting based on the plurality of non-touchdown read mode resistances of the touchdown sensor and the plurality of non-touchdown write mode resistances of the touchdown sensor.

7. The data storage device as recited in claim 6, wherein the control circuitry is further configured to:

measure a FHA setting delta between the plurality of non-touchdown read mode resistances of the touchdown sensor and the plurality of non-touchdown write mode resistances of the touchdown sensor; and estimate the write touchdown FHA setting based on the FHA setting delta.

8. The data storage device as recited in claim 6, wherein the control circuitry is further configured to estimate the write touchdown FHA setting by subtracting the FHA setting delta from the read mode FHA setting that causes the head to contact the disk.

9. The data storage device as recited in claim 1, wherein the control circuitry is further configured to:

while in the read mode, measure at least one non-touchdown read mode resistance of the touchdown sensor;

measure an FHA delta setting between the non-touchdown read mode resistance of the touchdown sensor and the non-touchdown write mode resistance of the touchdown sensor; and estimate the write touchdown FHA setting based on the FHA setting delta.

10. The data storage device as recited in claim 9, wherein the control circuitry is further configured to estimate the write touchdown FHA setting by subtracting the FHA setting delta from the read mode FHA setting that causes the head to contact the disk.

11. The data storage device as recited in claim 1, wherein the control circuitry is further configured to:

while in the write mode, measure at least one touchdown write mode resistance of the touchdown sensor;

measure a slope of a line passing through the touchdown write mode resistance and the touchdown read mode resistance; and estimate the write touchdown FHA setting based on the slope of the line.

12. A method of operating a data storage device, the method comprising:

configuring the data storage device into a read mode;

while in the read mode, adjusting a fly height actuator (FHA) setting until a head contacts a disk and measuring a touchdown read mode resistance of a touchdown sensor;

configuring the data storage device into a write mode and adjust the FHA setting so the head is not contacting the disk;

while in the write mode, measuring a non-touchdown write mode resistance of the touchdown sensor; and estimating a write touchdown FHA setting that will cause the head to contact the disk while in the write mode based on the touchdown read mode resistance and the non-touchdown write mode resistance.

13. The method as recited in claim 12, further comprising:

while in the write mode, adjusting the FHA setting and measuring a non-touchdown write mode resistance of the touchdown sensor until the non-touchdown write mode resistance nears the touchdown read mode resistance; and estimating the write touchdown FHA setting by extrapolating the non-touchdown write mode resistances toward the touchdown read mode resistance.

14. The method as recited in claim 12, further comprising estimating the write touchdown FHA setting based on a delta from a read touchdown FHA setting that causes the head to contact the disk while in the read mode, wherein the delta is based on the touchdown read mode resistance and the non-touchdown write mode resistance.

15. The method as recited in claim 12, further comprising:

while in the read mode, measuring a non-touchdown read mode resistance of the touchdown sensor for a plurality of the FHA settings; and estimating the write touchdown FHA setting based on the plurality of non-touchdown read mode resistances of the touchdown sensor.

16. The method as recited in claim 15, further comprising:

first linear fitting the plurality of non-touchdown read mode resistances and generating a delta representing a difference between the read mode FHA setting that causes the head to contact the disk and a FHA setting corresponding to a first intercept of the first linear fitting with the touchdown read mode resistance of the touchdown sensor;

while in the write mode, adjusting the FHA setting and measuring a non-touchdown write mode resistance of the touchdown sensor for a plurality of the FHA settings;

second linear fitting the plurality of non-touchdown write mode resistances of the touchdown sensor; and estimating the write touchdown FHA setting based on the delta and a second intercept of the second linear fitting with the touchdown read mode resistance of the touchdown sensor.

17. The method as recited in claim 15, further comprising:
while in the write mode, adjusting the FHA setting and measuring a non-touchdown write mode resistance of the touchdown sensor for a plurality of the FHA settings; and estimating the write touchdown FHA setting based on the plurality of non-touchdown read mode resistances of the touchdown sensor and the plurality of non-touchdown write mode resistances of the touchdown sensor.

18. The method as recited in claim 17, further comprising:
measuring an FHA setting delta between the plurality of non-touchdown read mode resistances of the touchdown sensor and the plurality of non-touchdown write mode resistances of the touchdown sensor; and estimating the write touchdown FHA setting based on the FHA setting delta.

19. The method as recited in claim 17, further comprising estimating the write touchdown FHA setting by subtracting the FHA setting delta from the read mode FHA setting that causes the head to contact the disk.

20. The method as recited in claim 12, further comprising:
while in the read mode, measuring at least one non-touchdown read mode resistance of the touchdown sensor;

measuring an FHA delta setting between the non-touchdown read mode resistance of the touchdown sensor and the non-touchdown write mode resistance of the touchdown sensor; and estimating the write touchdown FHA setting based on the FHA setting delta.

21. The method as recited in claim 20, further comprising estimating the write touchdown FHA setting by subtracting the FHA setting delta from the read mode FHA setting that causes the head to contact the disk.

22. The method as recited in claim 12, further comprising:
while in the write mode, measuring at least one touchdown write mode resistance of the touchdown sensor;

measuring a slope of a line passing through the touchdown write mode resistance and the touchdown read mode resistance; and estimating the write touchdown FHA setting based on the slope of the line.

* * * * *